Jan. 31, 1933.   J. W. WHITE   1,895,561
VEHICLE BRAKE
Filed April 27, 1931   2 Sheets-Sheet 1
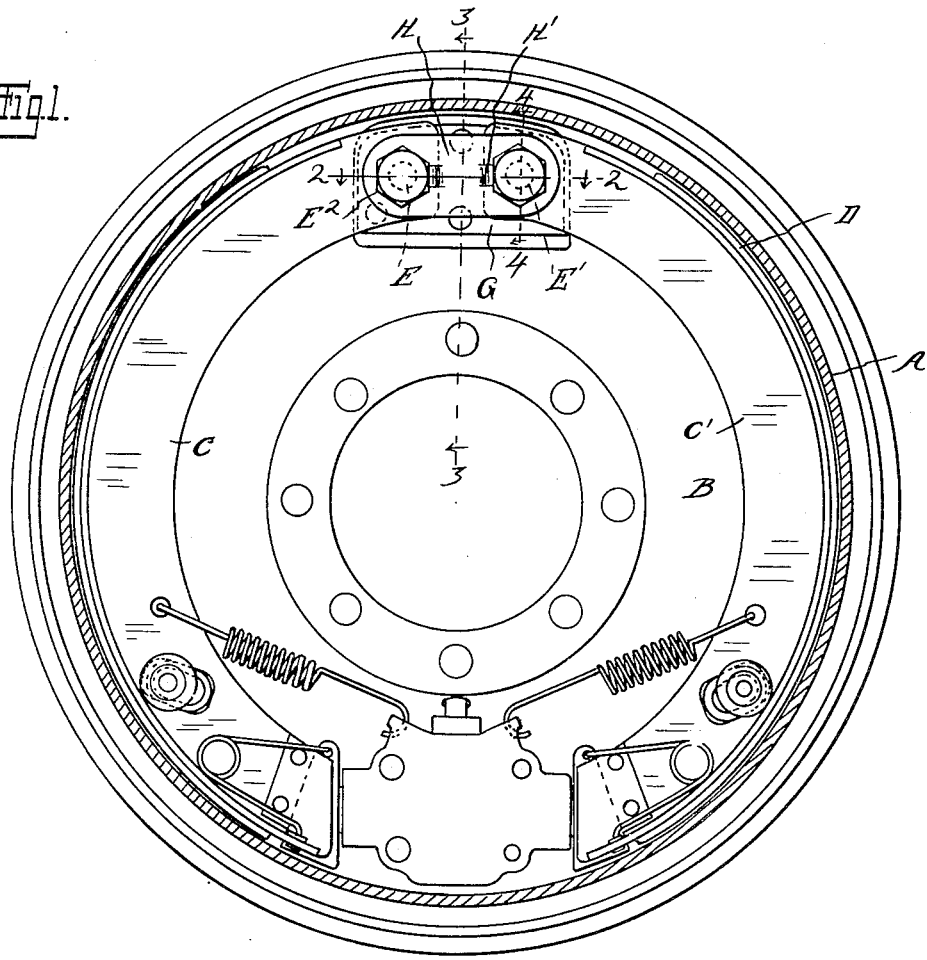
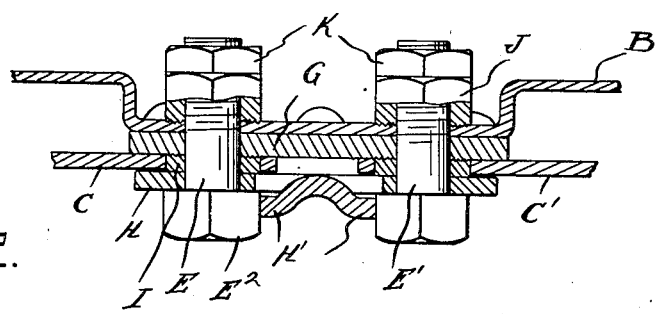
INVENTOR
John W. White
BY Whittemore Hulbert
Whittemore & Belknap
ATTORNEYS Jan. 31, 1933. J. W. WHITE 1,895,561
VEHICLE BRAKE
Filed April 27, 1931 2 Sheets-Sheet 2
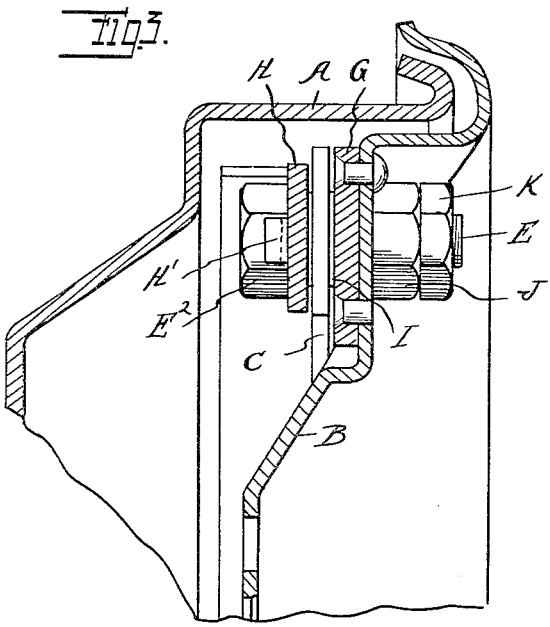
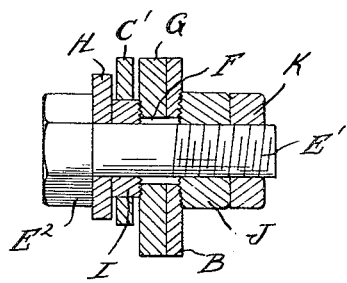
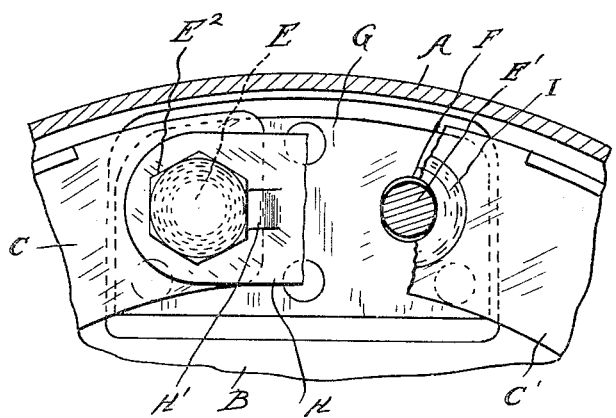
INVENTOR
John W. White
BY Whittemore Hulbert
Whittemore & Belknap
ATTORNEY Patented Jan. 31, 1933

1,895,561

UNITED STATES PATENT OFFICE

JOHN WILLIAM WHITE, OF DETROIT, MICHIGAN

VEHICLE BRAKE

Application filed April 27 1931. Serial No. 533,296.

The invention relates to vehicle brakes of the internal type in which the braking action is effected by the radially outward expansion of brake shoes within a brake drum. With such type it is usual to hinge the shoes upon studs fastened to the stationary brake head. It is, however, necessary that these hinged studs should be positioned with a degree of accuracy that it is difficult or impossible to attain under ordinary manufacturing conditions. Therefore it is usual to provide some means of adjustment which must be manually operated and which requires skill on the part of the adjuster.

It is the object of the present invention to simplify the manufacture and to attain a high degree of accuracy in the location of the studs without requiring any special skill on the part of the adjuster. This I have accomplished by the peculiar construction of adjustable stud carrier and the means for locking the same in fixed relation to the stationary brake head, as hereinafter set forth.

In the drawings:

Figure 1 is a section through a portion of a brake drum showing the anchoring studs and connecting parts;

Figure 2 is a section on line 2—2 of Figure 1;

Figure 3 is a section on line 3—3 of Figure 1;

Figure 4 is an enlarged section on line 4—4 of Figure 1;

Figure 5 is an enlarged sectional elevation of a portion of Figure 1.

A is the brake drum, B the stationary brake head or brake shoe carrier and C and C' are the brake shoes provided with suitable lining D. The shoes C are hinged to stud bolts E and E' which pass through slotted apertures F in the brake head B and in a reinforcing plate G secured to said brake head. The bolts are also connected by a link plate H which is placed on the inner side of the brake shoe and has circular apertures closely fitting the shank of the bolt. This link plate has struck-out ears H' adapted to bear against one side of the polygonal head $E^2$ of each of the bolts so as to hold the same from rotation.

The shoes C and C' instead of directly bearing on the studs E and E' engage bearing rings I which are sleeved on said studs. These rings are of greater thickness than the web of the shoes and are provided on one side with serrations preferably concentric with the axis. J are clamping nuts engaging the threaded portion of the studs which are also provided with serrations preferably concentric with the axis. The arrangement is such that when the nuts J are tightened the serrated faces on the nuts and on the rings I will be forced against the opposite faces of the slotted brake head and reinforcing plate and will bite into these surfaces so as to hold the studs from movement in the slotted apertures F.

Without describing the construction of the brake in further detail, it will be understood that the shoes C and C' are expanded by any suitable mechanism interposed between their free ends which will force the shoes and linings thereof against the inner face of the drum. For initial adjustment of the brake the nuts J on the studs E and E' are loosened sufficiently to permit a movement of the studs in the slotted apertures F of the brake head B and reinforcement plate G. The operator then expands the brake shoes through the medium of a brake pedal and connecting mechanism (not shown) which forces the brake linings against the inner surface of the drum, the studs E and E' automatically adjusting themselves in the slotted apertures F. While pressure is still retained on the brake shoes the nut J is tightened so as to cause the serrations thereon as well as those on the rings G to bite into the adjacent surfaces so as to hold the studs from further movement. Lock nuts K on the stud are then tightened and the parts will be rigidly locked and retained in such position throughout the life of the brake shoe linings. If it becomes necessary to reline the brakes this same operation is repeated to secure proper adjustment for the new linings.

While I have described serrations on both the rings I and the nuts J, it may not be necessary to place the same on both of these members, as one alone would hold the stud from radial movement when clamped. It will be understood that the serrated face is sufficiently hardened to bite into the metal of the abutting face.

What I claim as my invention is:

1. The combination with a brake drum, of a brake shoe therein, a brake head or carrier, an anchor bolt forming a pivotal bearing for said shoe engaging a slotted aperture in said brake head to be adjustable radially thereof, a serrated bearing on said anchor bolt for engaging said head or carrier, a clamping nut for forcing said serrated bearing to bite into said head and means for applying braking pressure to said shoe adapted when said nut is released to force all portions of the friction surface of said shoe into contact with said drum whereby on the tightening of said nut the pivot for the shoe will be properly positioned.

2. The combination with a brake drum, of a brake shoe therein, a stationary head or brake carrier, an adjustable pivot anchor for said shoe passing through a slotted aperture in said brake head and provided with a serrated shoulder for contacting said head, a clamping nut for forcing said serrated shoulder to bite into said head to lock the same from movement in the slotted bearings, and brake applying means adapted when said nut is released to force said shoe with all portions of the friction face thereof in contact with said drum and to position said pivot anchor whereby on the tightening of said nut said pivot anchor will be retained in accurate position.

3. The combination with a brake drum, of a brake shoe therein, a stationary head or brake carrier, a bolt passing through a radially slotted aperture in said brake head and an aperture in said shoe, a collar surrounding said bolt forming a bushing in the aperture in said shoe and constituting a pivot bearing therefor, said collar being of slightly greater thickness than said shoe, a nut engaging said bolt to clamp said slotted head between the same and said collar, one of the clamping faces being serrated to bite in to said head and means for applying the brake to force all portions of the friction face thereof in contact with the drum when said nut is released whereby the tightening of said nut will clamp the pivot anchor to properly position the same.

4. The combination with a brake drum, of a brake shoe therein, a brake head or carrier, a reinforcement plate secured to said head or carrier, an anchor bolt passing through a radially slotted aperture in said head and reinforcement plate, a collar sleeved on said bolt and engaging a pivot bearing in said shoe, said collar being greater in thickness than the portion of said shoe engaging the same, a flange sleeved on said bolt on the opposite side of said shoe from said reinforcement plate, a nut engaging said anchor bolt for clamping said flange and collar to said head, one of the clamping faces being serrated for biting in to its contacting face and means for applying braking pressure to said shoe for forcing all portions of the friction surface thereof in contact with the drum when said nut is released whereby upon the clamping of said nut the pivot will be properly positioned.

5. The combination with a brake drum, of a pair of brake shoes engaging opposite sides of said drum, a brake head, a reinforcement plate attached to said head, a pair of anchor bolts passing through radially extending apertures in said head and reinforcement plate, collars sleeved on said anchor bolts and forming pivots for engaging said shoes, the thickness of said collars being slightly greater than the thickness of the portions of the shoe engaging the same, a tie plate apertured to be sleeved on said bolts and forming a connection between the same, said tie plate having struck-up portions for engaging the polygonal heads of said bolts to hold the same from rotation, nuts engaging threaded portions of said bolts on the opposite sides of said head to clamp said tie plate and collars to said head, one of the clamping faces being serrated to bite in to said head and means for spreading the free ends of said shoes to force all portions of the friction faces thereof in contact with said drum when said clamping nuts are released whereby the pivots for the shoes are accurately positioned and are held in this relation by the clamping of said nuts.

In testimony whereof I affix my signature.

JOHN WILLIAM WHITE.